(12) United States Patent
Robertson et al.

(10) Patent No.: US 6,679,108 B2
(45) Date of Patent: Jan. 20, 2004

(54) METHOD FOR SYNCHRONIZING A PULSETRAIN WITH ENGINE CYCLE

(75) Inventors: William R. Robertson, Irondequoit, NY (US); Sergio Eduardo Garcia, Webster, NY (US); Kevin Michael Foley, Rochester, NY (US)

(73) Assignee: Delphi Technologies, Inc., Troy, MI (US)

( * ) Notice: Subject to any disclaimer, the term of this patent is extended or adjusted under 35 U.S.C. 154(b) by 58 days.

(21) Appl. No.: 10/143,580

(22) Filed: May 10, 2002

(65) Prior Publication Data

US 2003/0000293 A1 Jan. 2, 2003

Related U.S. Application Data

(60) Provisional application No. 60/299,996, filed on Jun. 21, 2001.

(51) Int. Cl.$^7$ .............................................. G01M 15/00
(52) U.S. Cl. ...................................................... 73/117.3
(58) Field of Search ............................ 73/116, 117.2, 73/117.3, 118.1

(56) References Cited

U.S. PATENT DOCUMENTS 5,509,302 A * 4/1996 Drexel et al. ............... 73/117.3
5,577,475 A 11/1996 De Backer et al. ......... 123/417
5,717,133 A * 2/1998 Wui et al. ...................... 73/116
5,808,186 A * 9/1998 Matsumoto et al. ........ 73/117.3

\* cited by examiner

Primary Examiner—Edward Lefkowitz
Assistant Examiner—Maurice Stevens
(74) Attorney, Agent, or Firm—Patrick M. Griffin

(57) ABSTRACT

A method of synchronizing a crankshaft signal with the stroke cycle of a four-stroke internal combustion engine induces misfiring in a specified engine cylinder, and uses an assumed synchronization to identify the misfiring cylinder. The crankshaft signal is used to identify reference angular positions of the crankshaft intermediate top dead center positions of consecutive cylinders of the engine firing order, and a time difference between successive reference positions is determined. When the assumed synchronization is such that the current rotation of the crankshaft includes the cylinder in which misfiring is induced, the determined time difference is accumulated in a first accumulator; otherwise, the determined time difference is accumulated in a second accumulator. The presence of misfiring causes the two accumulators to diverge in value, and the direction of such divergence is used to determine if the assumed synchronization is correct or incorrect.

10 Claims, 4 Drawing Sheets

METHOD FOR SYNCHRONIZING A PULSETRAIN WITH ENGINE CYCLE

PRIOR APPLICATION

This application claims the benefit of prior Provisional Patent Application Serial No. 60/299,996 filed Jun. 21, 2001.

TECHNICAL FIELD

This invention relates to a method of resolving engine cycle ambiguity in a crankshaft position signal of a four-stroke internal combustion engine.

BACKGROUND OF THE INVENTION

The control of fuel and spark events (among others) in an internal combustion engine requires knowledge of the engine cycle position. A common approach with four-stroke engines is to develop a high resolution position signal based on rotation of the engine crankshaft (which rotates twice per engine cycle), and a low resolution position signal based on rotation of the engine camshaft (which rotates once per engine cycle). In this case, the high resolution crankshaft signal is used to time the fuel and spark, and the low-resolution camshaft signal is used to synchronize the crankshaft signal with the engine stroke cycle.

While the above-described approach works well, various techniques have been developed to either eliminate the camshaft sensor or to provide a level of redundancy in case of a camshaft sensor failure. For example, in the U.S. Pat. No. 5,577,475 to De Backer et al., issued on Nov. 26, 1996, the engine controller assumes an initial crankshaft signal synchronization, supplies fuel to all but a specified one of the engine cylinders to induce misfiring the specified cylinder, and then monitors the engine speed based on the assumed synchronization to identify an acceleration spike attributable to misfiring. If the timing of the acceleration spike indicates that the specified cylinder is misfiring, the assumed synchronization is verified as correct; if the timing of the acceleration spike indicates that a cylinder opposite the specified cylinder is misfiring, incorrect synchronization is indicated, and the assumed synchronization is reversed. This approach can be used effectively, but the acceleration spike calculations are both time consuming and subject to noise-related error, particularly when the engine speed is changing during the induced misfiring. Accordingly, what is needed is a simpler and more reliable method of identifying an induced misfire.

SUMMARY OF THE INVENTION

The present invention is directed to an improved method of synchronizing a crankshaft signal with the stroke cycle of a four-stroke internal combustion engine by inducing full or partial misfiring in a specified engine cylinder, and using an assumed synchronization to identify the misfiring cylinder. According to the invention, the crankshaft signal is used to identify reference angular positions of the crankshaft intermediate top dead center positions of consecutive cylinders of the engine firing order, and a time difference between successive reference positions is determined. When the assumed synchronization is such that the current rotation of the crankshaft includes the cylinder in which misfiring is induced, the determined time difference is accumulated in a first accumulator; otherwise, the determined time difference is accumulated in a second accumulator. The presence of misfiring causes the two accumulators to diverge in value, and the direction of such divergence is used to determine if the assumed synchronization is correct or incorrect.

BRIEF DESCRIPTION OF THE DRAWINGS

FIG. 3 depicts the routine in general, and FIG. 4 depicts a portion of the routine that determines if synchronization detection should be enabled, and FIG. 5 depicts a portion of the routine pertaining to identification of a misfiring engine cylinder based on an assumed crankshaft synchronization.

DESCRIPTION OF THE PREFERRED EMBODIMENT

Figure 1:
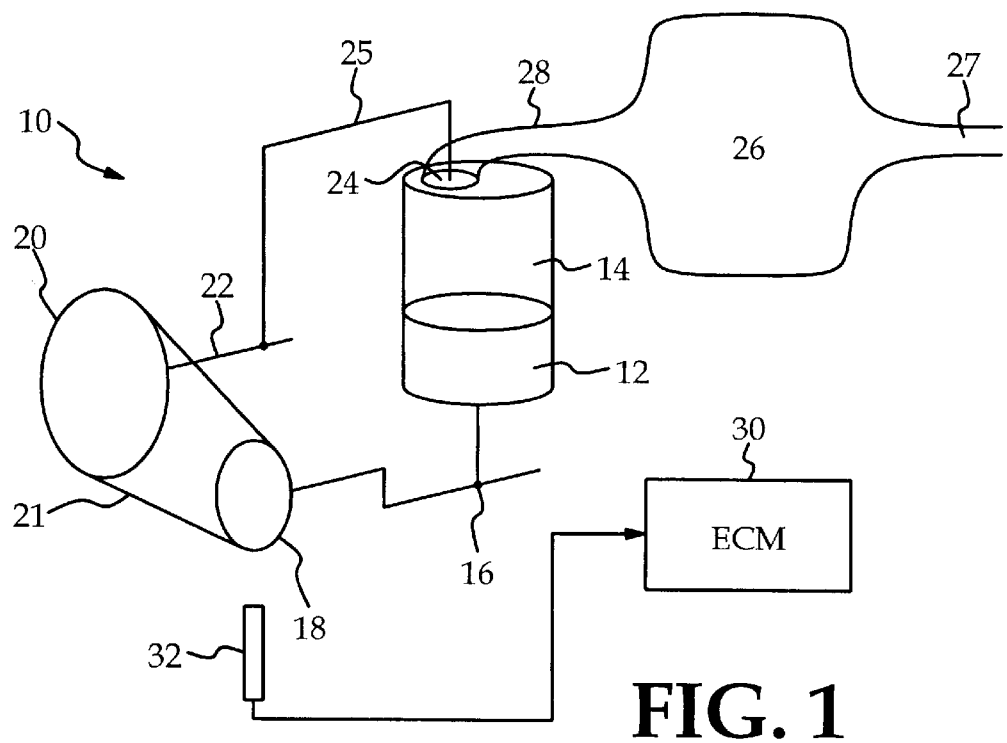
FIG. 1 is a schematic diagram of selected components of an engine control system according to this invention, including a crankshaft position sensor and a microprocessor-based engine control module.

The present invention is disclosed in the context of an engine control system including a four-stroke internal combustion engine generally designated in FIG. 1 by the reference numeral 10. Referring to FIG. 1, the engine 10 includes a number of pistons 12 (only one of which is shown) which reciprocate in respective cylinders 14 and are connected to crankshaft 16. The crankshaft 16 is connected to the crank-wheel 18, which is mechanically coupled to a cam-wheel 20 by a belt or chain 21 so that the crank-wheel 18 and the cam-wheel 20 rotate synchronously. The cam-wheel 20 is connected to a camshaft 22, which opens and closes a cylinder intake valve 24 through a mechanical linkage 25 in coordination with the movement of piston 12. Intake air enters an intake manifold 26 through a throttle passage 27, and is delivered to each of the cylinders 14 via a respective intake runner 28 and intake valve 24. Obviously, engine 10 includes many other component parts that are also conventional and known in the state of the art to be part of an operational engine system. While the present invention is applicable to a variety of engine configurations, it will be assumed for purposes of the ensuing description that the engine 10 has four cylinders (designated herein as cylinders #1, #2, #3 and #4), and that the cylinder firing order is 1-3-4-2.

Figure 2:
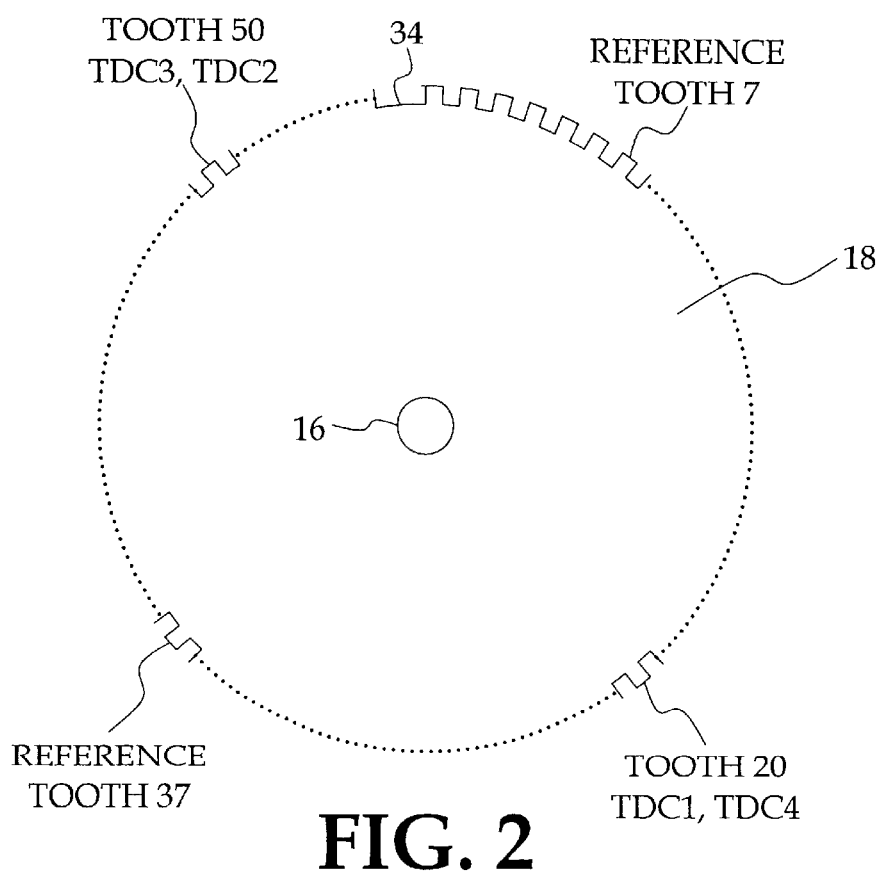
FIG. 2 is a diagram of a toothed engine crank-wheel to which the crankshaft position sensor of FIG. 1 is responsive.

A microprocessor-based engine control module (ECM) 30 controls the timing of various engine cycle-related events (including fuel injection and spark timing, for example) based on the output of a sensor 32 responsive to the rotation of crank-wheel 18. Typically, the outer periphery of crank-wheel 18 is toothed, and the sensor 32 is a variable reluctance or similar sensor that produces an electrical pulse corresponding to the passage of each such tooth or edge thereof. FIG. 2 illustrates a representative crank-wheel 18, having fifty-eight teeth and a notch 34 (that is two teeth in width) for identifying a predetermined crankshaft position. In the illustration, the crank-wheel teeth are numbered in clockwise sequence as shown, and the cylinder top dead center positions TDC1, TDC2, TDC3 and TDC4 for cylinders #1, #2, #3 and #4, respectively, are achieved when specified teeth pass the sensor 32. Since the crank-wheel 18 rotates twice per engine cycle, the top dead center events for two different cylinders are signified by a single crank-wheel tooth (TDC1 and TDC4 at tooth 20, and TDC3 and TDC2 at tooth 50), and ECM 30 has to synchronize the crankshaft position signal with the engine cycle in order to correctly determine which cylinder of each cylinder pair is in its compression stroke. As generally described in the U.S. Pat. No. 5,577,475 to De Backer et al., incorporated herein by reference, this can be achieved by assuming an initial synchronization, inducing a misfire in a specified engine cylinder, and then using the assumed synchronization to identify the misfiring cylinder based on crankshaft speed fluctuation. For example, ECM 30 can be programmed to assume that the first time tooth number 20 passes sensor 32 during engine cranking, cylinder #1 is the compression stroke with its piston 12 in the top dead center position, and that cylinder #3 is in the same state when tooth 50 passes sensor 32. On the second passage of tooth number 20, ECM 30 assumes that cylinder #4 is in the compression stroke with its piston 12 in the top dead center position, and that cylinder #2 is in the same state on the second passage of tooth 50. When the crankshaft speed fluctuation indicates a misfire, the assumed synchronization of the crankshaft signal is used to identify which engine cylinder is misfiring. If the assumed synchronization is correct, the ECM 30 will identify the specified engine cylinder (say, cylinder #1) as the misfiring cylinder; if the assumed synchronization is incorrect, the ECM 30 will identify the opposing engine cylinder (that is, cylinder #4) as the misfiring cylinder. If the assumed synchronization is proven incorrect, it is reversed (phase-shifted by 180 camshaft degrees or 360 crankshaft degrees), whereupon the synchronization will be correct.

The present invention is directed to a method of processing engine speed fluctuations based on the assumed crankshaft synchronization in the presence of induced misfiring to simply and reliably determine if the assumed crankshaft synchronization is correct. To this end, the ECM 30 identifies reference crankshaft positions intermediate the cylinder top dead center positions, and records a timer value each time a reference position passes the sensor 32. In the illustration of FIG. 2, the reference positions correspond to crank-wheel tooth numbers 7 and 37, referred to herein as reference teeth. Three successively recorded timer values define two reference intervals, and after each passage of a reference tooth, ECM 30 uses the three most recent timer values to compute a difference in the two reference intervals. For example, if T1, T2 and T3 represent three successively recorded timer values defining a first reference interval between timer values T1 and T2, and a second reference interval between timer values T2 and T3, the difference D in the first and second reference intervals can be given by:

$$D=(T3-T2)-(T2-T1)=T3-(2*T2)+T1 \qquad (1)$$

According to the invention, the ECM 30 accumulates the computed time differences in either first or second accumulator variables ACCUM1 or ACCUM2. When the assumed crankshaft synchronization is such that the current rotation of crank-wheel 18 includes the cylinder in which misfiring is induced (cylinder #1 in the illustrated embodiment), the time difference D is accumulated in ACCUM1; that is:

$$ACCUM1=ACCUM1+D \qquad (2)$$

When the current rotation of crank-wheel 18 does not include the cylinder in which misfiring is induced, the time difference D is accumulated in ACCUM2; that is:

$$ACCUM2=ACCUM2+D \qquad (3)$$

If the assumed synchronization is correct, the cyclic engine speed variation due to the misfiring will cause ACCUM1 to become increasingly negative, and ACCUM2 to become increasingly positive. If the assumed synchronization is incorrect, the cyclic engine speed variation due to the misfiring will cause ACCUM1 to become increasingly positive, and ACCUM2 to become increasingly negative. Non-cyclic engine speed variation, on the other hand, tends to affect ACCUM1 and ACCUM2 similarly. Thus, the presence of misfiring can be verified if the magnitude of the difference between ACCUM1 and ACCUM2—|ACCUM2−ACCUM1|— exceeds a threshold THR_DIFF, and the misfiring cylinder can be identified based on the magnitude and polarity of ACCUM1 and ACCUM2. That is, the assumed synchronization is verified as correct if ACCUM2 becomes more positive than a positive threshold THR_POS and ACCUM1 becomes more negative than a negative threshold THR_NEG, and the assumed synchronization is determined to be incorrect if ACCUM1 becomes more positive than THR_POS and ACCUM2 becomes more negative than THR_NEG. However, empirically testing has shown that the misfiring cylinder can be reliably identified when just two of the three tests are satisfied, which further simplifies and expedites the method of this invention.

Figure 3A:
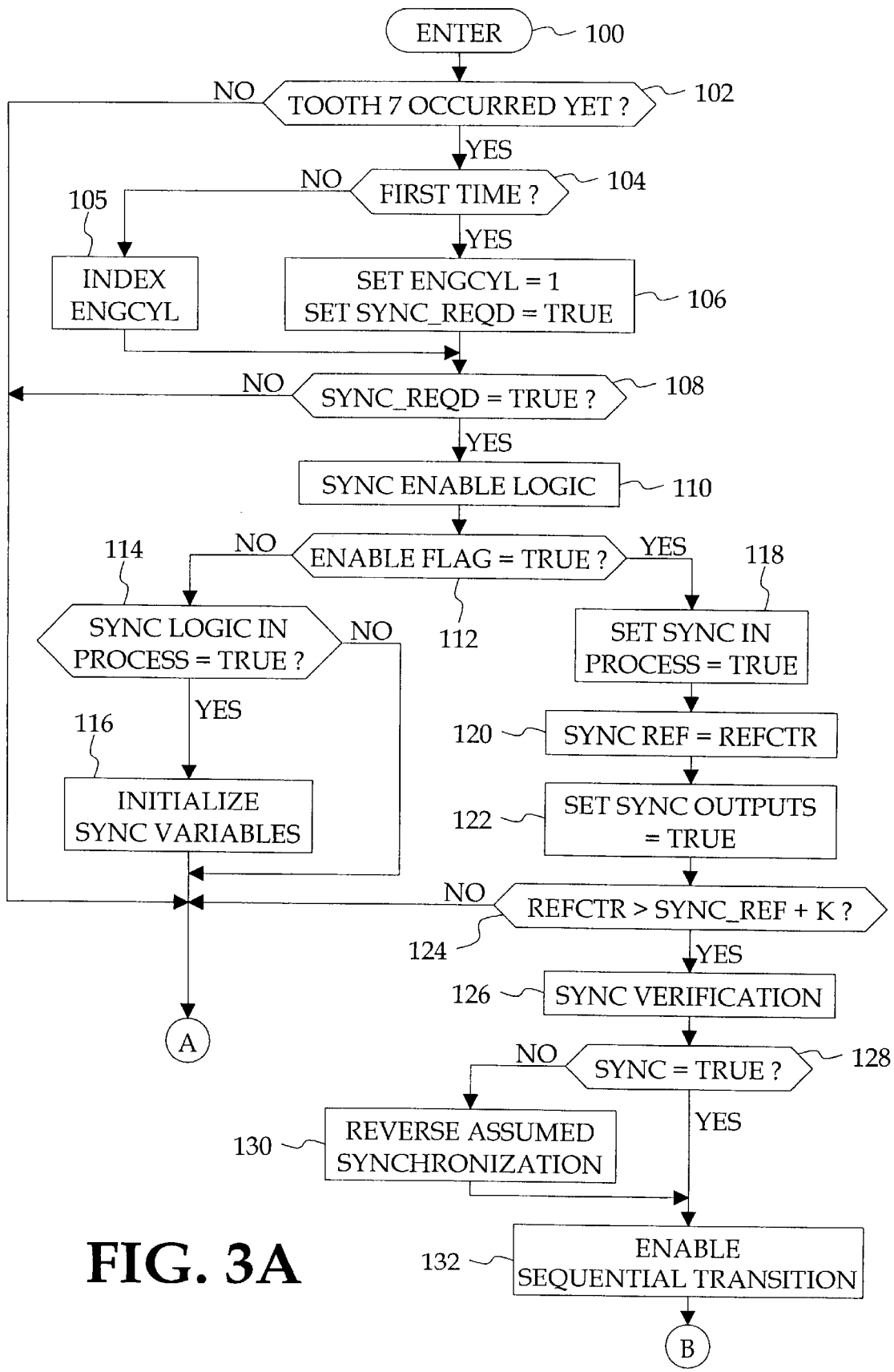
FIGS. 3, 4 and 5 are flow diagrams representative of a software routine executed by the engine control module of FIG. 1 when reference teeth of the engine crank-wheel pass the crankshaft position sensor.
Figure 3B:
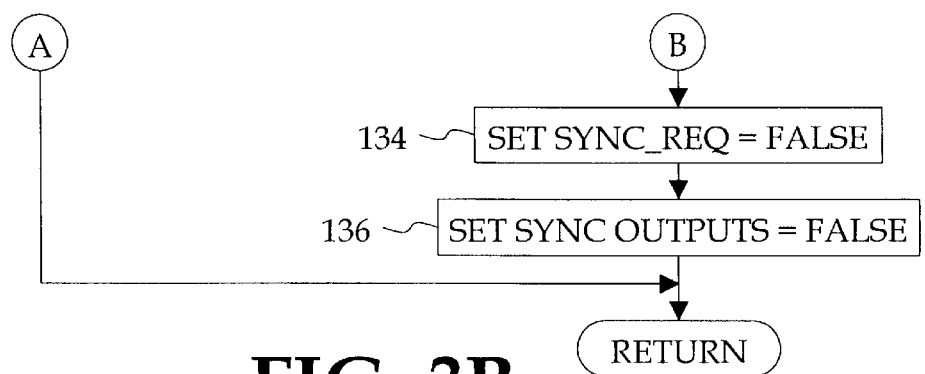
Figure 4:
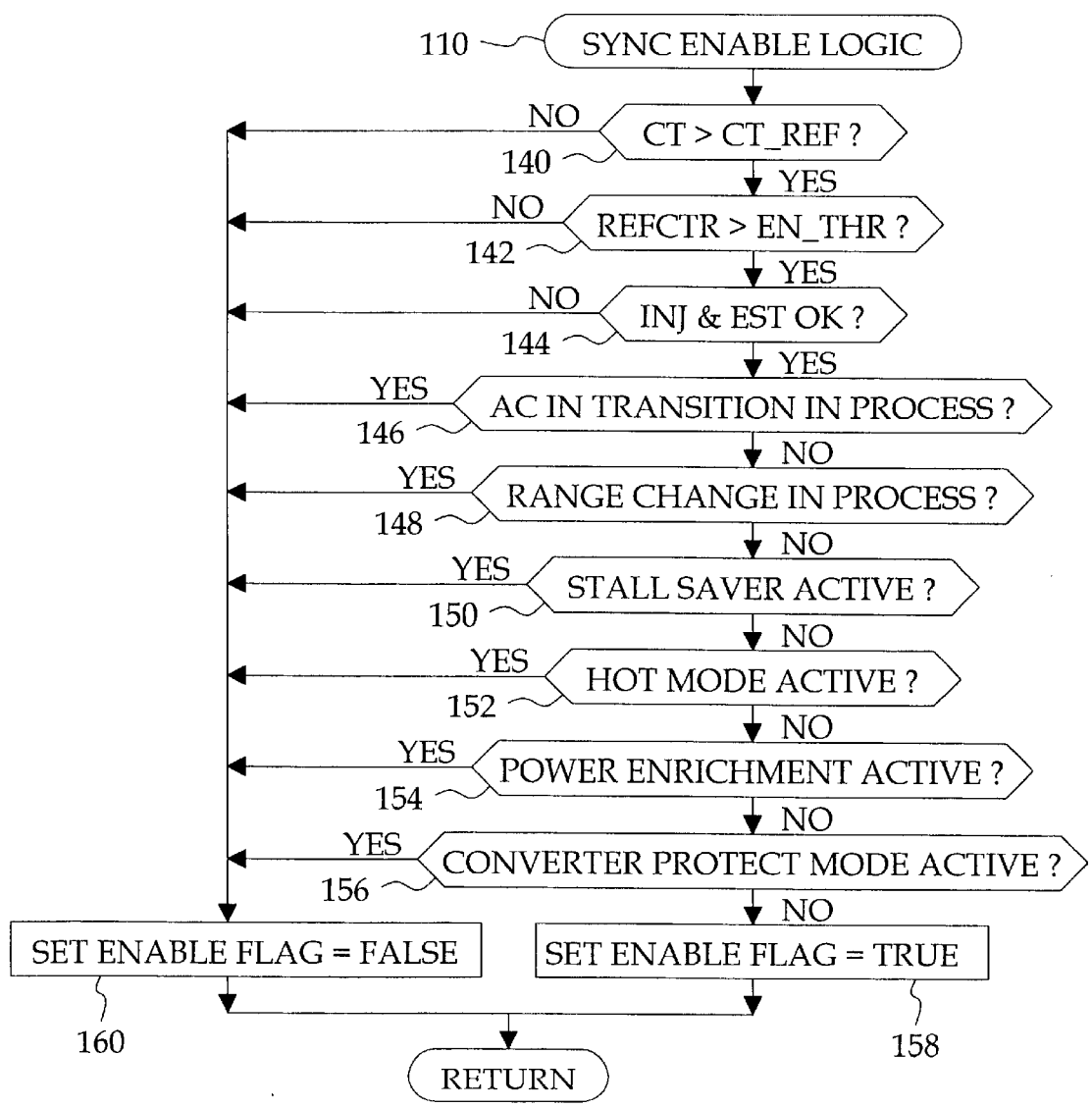
Figure 5:
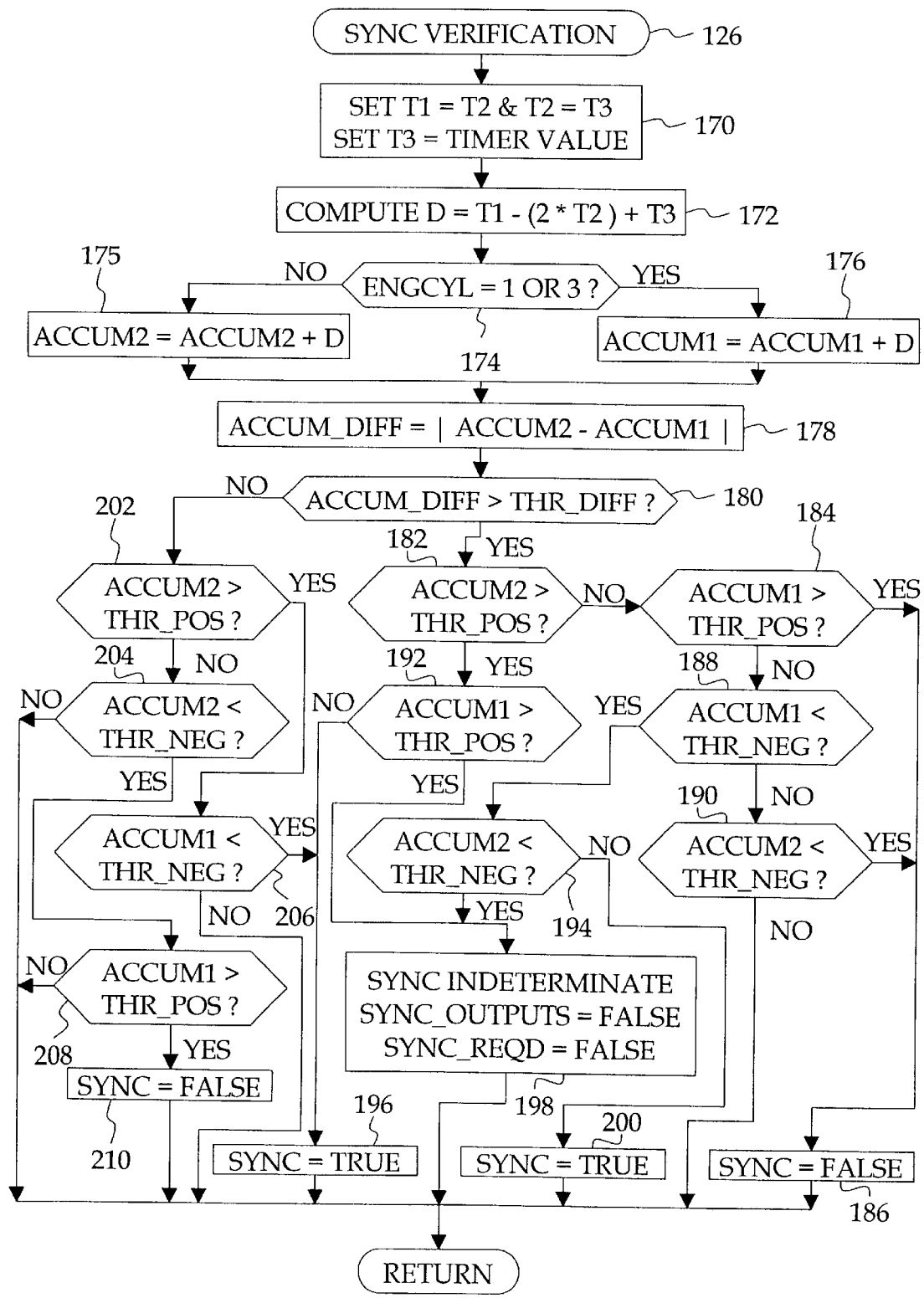

The above-described method is illustrated in further detail by the flow diagrams of FIGS. 3–5, which depict a software routine that is executed by ECM 30 each time a reference tooth (tooth 7 or tooth 37 of FIG. 2) of crank-wheel 18 passes the crankshaft position sensor 32. The flow diagram of FIG. 3 depicts the routine in general, while FIG. 4 depicts a portion of the routine that determines if synchronization detection should be enabled, and FIG. 5 depicts a portion of the routine pertaining to identification of a misfiring engine cylinder based on an assumed crankshaft synchronization. Other background routines executed by ECM 30 initialize the various parameters and variables referred to herein at each off-to-on transition of the vehicle ignition switch, identify the crank-wheel notch 34, and count the crank-wheel teeth.

Referring to FIG. 3, the blocks 102, 104 and 106 are executed to establish an assumed synchronization of crankshaft 16 during engine cranking. Prior to the first occurrence of reference tooth 7, block 102 is answered in the negative, and the remainder of the routine is skipped. At the first occurrence of reference tooth 7, blocks 102 and 104 are both answered in the affirmative, and block 106 establishes the assumed crankshaft synchronization by setting the variable ENGCYL to 1, indicating that the compression stroke top dead center position for cylinder #1 (i.e., TDC1) will occur at the next passage of tooth 20. Of course, this is just one of two possibilities, as explained above. Thereafter, block 104 is answered in the negative, and the block 105 indexes ENGCYL to 3, the next cylinder in the engine firing order. In subsequent executions of the routine, block 105 indexes ENGCYL to 4, then to 2, and then back to 1, and so on. The block 108 then checks the status of the Sync_Reqd flag to determine if verification of the crankshaft synchronization is required; this flag is initially set to TRUE, so that block 108 is initially answered in the affirmative. In such case, the block 110 executes Sync_Enable logic (depicted in detail in the flow diagram of FIG. 4) for determining if synchronization verification is enabled. Initially, synchronization verification is typically not enabled (i.e., Enable flag=False), and blocks 112 and 114 are answered in the negative, completing the routine. However, if synchronization verification is already in process (as indicated by the status of the Sync_In_Process flag, the blocks 114 and 116 re-initialize the sync verification variables. Once block 110 sets the Enable flag to True, the blocks 118, 120 and 122 are executed to set the Sync_In_Process flag, to initialize the variable Sync_Ref at the current count of a reference counter REFCTR, and to set the Sync_Outputs flag to True. When the Sync_Outputs flag is True, a fuel control routine executed by ECM 30 interrupts the supply of fuel to a specified cylinder, cylinder #1 in the illustrated embodiment. The block 124 then compares REFCTR to the sum (Sync_Ref+K), where K is a calibration term. After a predetermined delay defined by the calibration term K, block 124 will be answered in the affirmative, and the Sync_Verification block 126 (depicted in detail in the flow diagram of FIG. 5) is executed to determine if the synchronization established at block 106 is correct. If the synchronization is correct, block 128 will be answered in the affirmative, and the blocks 132, 134 and 136 are executed to enable sequential fuel control, and to set the Sync_Reqd and Sync_Outputs flags to False, completing the routine. Setting the Sync_Outputs flag to False restores the supply of fuel to the specified cylinder. If the synchronization is incorrect, block 130 is executed to reverse the assumed synchronization prior to the execution of blocks 132, 134 and 136. In the illustrated embodiment, this is simply achieved by indexing ENGCYL twice; for example, if ENGCYL is #1, block 130 indexes ENGCYL to #4.

The flow diagram of FIG. 4 details the Sync Enable Logic block 110 of FIG. 3. Referring to FIG. 4, the blocks 140–156 identify various powertrain operating conditions that potentially interfere with quick and reliable verification of the assumed crankshaft synchronization. The block 140 determines if the engine coolant temperature CT is higher than a minimum temperature CT_REF. The block 142 determines if the current count of the reference counter REFCTR is greater than an enable threshold EN_THR. The block 144 determines if the electronic fuel injection (INJ) and spark timing (EST) systems are functioning normally. The block 146 determines if a transition of the air conditioning (AC) compressor clutch is in process. The block 148 determines if a range change of the transmission is in process. The block 150 determines if an engine stall prevention function is active. The block 152 determines if the engine 10 is operating in a hot mode. The block 154 determines if power enrichment fueling of engine 10 is active. And finally, the block 156 determines if a catalytic converter protection mode is active. As indicated, the block 158 sets the Enable flag to True if blocks 140–144 are answered in the affirmative and blocks 146–156 are answered in the negative; otherwise block 160 sets the Enable flag to False. As a practical matter, the various tests identified by the blocks 144–156 are not appropriate for all vehicles, and certain of such tests may be de-selected by calibration.

The flow diagram of FIG. 5 details the Sync Verification block 126 of FIG. 3. Referring to FIG. 5, the blocks 170 and 172 are first executed to update the reference times T1, T2 and T3, and to compute the time interval difference D according to equation (1). As indicated above, the reference times T1, T2 and T3 are clock or timer values corresponding to the passage of crank-wheel reference teeth 7 and 37 by the crankshaft sensor 32, with T3 being the most recent value. Thus, block 170 sets T1 equal to the previous value of T2, T2 to the previous value of T3, and T3 to the current timer value. If the assumed synchronization has assigned the specified cylinder to the current rotation of crank-wheel 18 (that is, if ENGCYL is #1 or #3), the block 174 is answered in the affirmative, and block 175 adds the time interval difference D to a first accumulator variable ACCUM1; otherwise, the block 176 adds the time interval difference D to a second accumulator variable ACCUM2. The block 178 then computes an accumulator difference ACCUM_DIFF according to the absolute value of (ACCUM2−ACCUM1). As indicated above, the cyclic engine speed variation due to the induced misfiring of cylinder #1 will cause ACCUM1 to become increasingly negative, and ACCUM2 to become increasingly positive if the assumed crankshaft synchronization is correct, and the opposite will occur if the assumed synchronization is incorrect. In either case, the divergence of ACCUM1 and ACCUM2 is represented by the accumulator difference ACCUM_DIFF. Thus, the function of the routine is to compare ACCUM1, ACCUM2 and ACCUM_DIFF to positive, negative and difference thresholds THR_POS, THR_NEG and THR_DIFF, and to set the state of the Sync flag accordingly. If the assumed synchronization is correct, ACCUM2 will become more positive than THR_POS, and ACCUM1 will become more negative than THR_NEG; if the assumed synchronization is incorrect, ACCUM2 will become more negative than THR_NEG and ACCUM1 will become more positive than THR_POS. In both cases, ACCUM_DIFF will exceed THR_DIFF. While all three conditions can be used for synchronization verification, empirically testing has shown that synchronization verification can be reliably achieved when just two of the three conditions are met. In other words, if ACCUM_DIFF is greater than THR_DIFF and ACCUM2 is more positive than THR_POS, reliable sync verification does not additionally require ECM 30 to confirm that ACCUM1 is also more negative than THR_NEG.

The blocks 180–210 of FIG. 5 carry out a two-out-of-three logical comparison of ACCUM1, ACCUM2 and ACCUM_DIFF to the respective thresholds as described above. The block 180 compares ACCUM_DIFF to THR_DIFF. If ACCUM_DIFF exceeds THR_DIFF, the blocks 182, 184, 188, 190, 192 and 194 are executed to determine if one of ACCUM1 and ACCUM2 is respectively above or below THR_POS and THR_NEG. Thus, if blocks 182 and 192 determine that ACCUM2 and not ACCUM1 are more positive than THR_POS, block 196 is executed to set the Sync flag to True, indicating that the assumed synchronization is correct. Similarly, if blocks 182, 184, 188 and 194 determine that ACCUM1 and not ACCUM2 are more negative than THR_NEG, block 200 is executed to set the Sync flag to True. On the other hand, if blocks 182 and 184 determine that ACCUM1 and not ACCUM2 are more positive than THR_POS, block 186 is executed to set the Sync flag to False, indicating that the assumed synchronization is incorrect. Similarly, if blocks 182, 184, 188 and 190 determine that ACCUM2 and not ACCUM1 are more negative than THR_NEG, block 186 is executed to set the Sync flag to False. In certain conditions, such as when both ACCUM1 and ACCUM2 are either more positive than THR_POS or more negative than THR_NEG, the outcome is indeterminate, and block 198 is executed to set the Sync_Outputs and Sync_Reqd flags to False to terminate sync verification.

If block 180 determines that ACCUM_DIFF does not exceed THR_DIFF, the blocks 202, 204, 206 and 208 determine if ACCUM1 is more positive than THR_POS and ACCUM2 is more negative than THR_NEG, or if ACCUM1 is more negative than THR_NEG and ACCUM2 is more positive than THR_POS. If blocks 202, 204 and 208 determine that ACCUM1 is more positive than THR_POS and ACCUM2 is more negative than THR_NEG, the block 210 is executed to set the Sync flag to False, indicating that the assumed synchronization is incorrect. If blocks 202 and 206 determine that ACCUM1 is more negative than THR_NEG and ACCUM2 is more positive than THR_POS, the block 196 is executed to set the Sync flag to True, indicating that the assumed synchronization is correct.

In summary, the method of the present invention provides an easily implemented technique for quickly and reliably verifying if an assumed synchronization of the crankshaft position signal with engine stroke cycle is correct or incorrect. The calculations involved in the method are very simple, and the method inherently detects cyclic speed variation due to induced misfiring even in the presence of non-cyclic variation in engine speed. While described in reference to the illustrated embodiment, it is expected that various modifications will occur to those skilled in the art. For example, the engine 10 may have a different number of cylinders 14 than illustrated, a different number or arrangement of teeth on the crank wheel 18, a difference placement of the reference and/or TDC locations on crank wheel 18, a different firing order, and so on. Thus, it should be understood that methods incorporating these and other modifications may fall within the scope of this invention, which is defined by the appended claims.

What is claimed is:

1. A method of verifying an assumed synchronization of a crankshaft signal for a multiple cylinder four-stroke internal combustion engine based on induced misfiring a specified engine cylinder, comprising the steps of:

identifying reference positions of the crankshaft signal intermediate top dead center positions of consecutively fired engine cylinders, and determining reference time intervals bounded by the identified reference positions;

determining time differences between successive reference time intervals;

accumulating the determined time differences in a first accumulator if the assumed synchronization is such that said consecutively fired engine cylinders include the specified cylinder, and in a second accumulator if the assumed synchronization is such that said consecutively fired engine cylinders do not include the specified cylinder; and determining whether the assumed synchronization is correct based on a detected divergence of the first and second accumulators and a direction of the detected divergence.

2. The method of claim 1, including the steps of:

assigning timer values T1, T2 and T3 to successively identified reference positions of the crankshaft signal; and determining said time differences in accordance with: (T1−(2*T2)+T3).

3. The method of claim 1, including the step of:

determining that the assumed synchronization cannot be verified if the detected divergence of the first and second accumulators exceeds a difference threshold, and both of the first and second accumulators exceed one of the first and second thresholds.

4. The method of claim 1, including the steps of:

defining first and second tests for correct synchronization based on comparisons of the first and second accumulators with respective first and second thresholds of opposite polarity; and determining that the assumed synchronization is correct if the detected divergence of the first and second accumulators exceeds a difference threshold, and at least one of the first and second tests for correct synchronization is met.

5. The method of claim 1, including the steps of:

defining first and second tests for correct synchronization based on comparisons of the first and second accumulators with respective first and second thresholds of opposite polarity; and determining that the assumed synchronization is correct if the first and second tests for correct synchronization are both met.

6. The method of claim 1, including the steps of:

defining first and second tests for incorrect synchronization based on comparisons of the first and second accumulators with respective first and second thresholds of opposite polarity; and determining that the assumed synchronization is incorrect if the detected divergence of the first and second accumulators exceeds a difference threshold, and at least one of the first and second tests for incorrect synchronization is met.

7. The method of claim 1, including the steps of:

defining first and second tests for incorrect synchronization based on comparisons of the first and second accumulators with respective first and second thresholds of opposite polarity; and determining that the assumed synchronization is incorrect if the first and second tests for incorrect synchronization are both met.

8. The method of claim 1, wherein the step of determining whether the assumed synchronization is correct is disabled when a temperature of said engine is below a reference temperature.

9. The method of claim 1, wherein the step of determining whether the assumed synchronization is correct is disabled when said engine has been operating for less than a reference time.

10. The method of claim 1, including the step of:

disabling the step of determining whether the assumed synchronization is correct when a specified change in engine loading is detected.

* * * * *